G. M. HUSTON.
Egg-Carriers.
No. 140,579.                          Patented July 8, 1873.
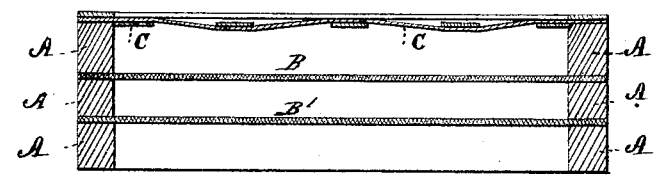
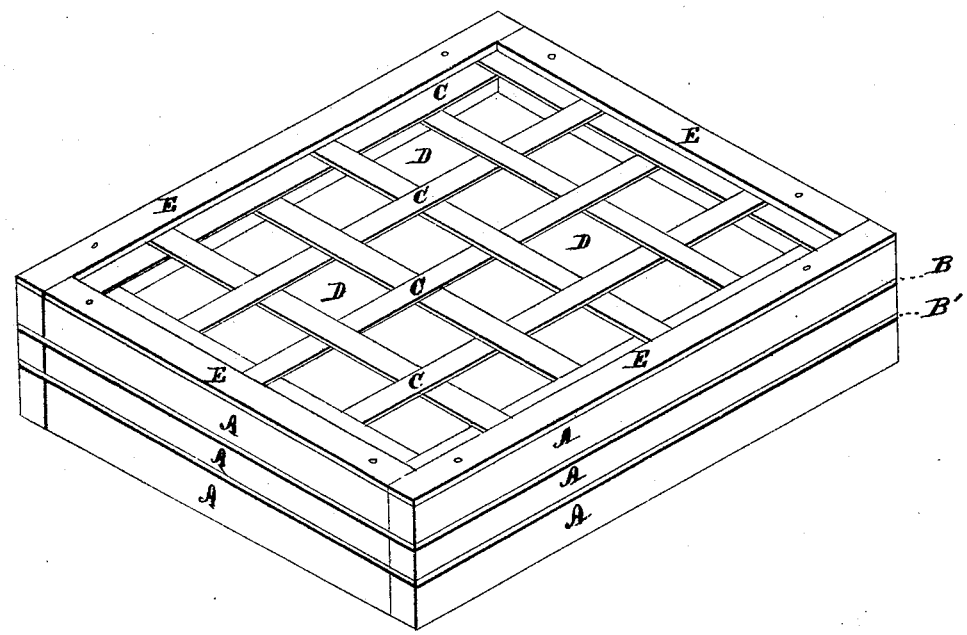

UNITED STATES PATENT OFFICE.

GEORGE M. HUSTON, OF ZANESVILLE, OHIO.

IMPROVEMENT IN EGG-CARRIERS.

Specification forming part of Letters Patent No. 140,579, dated July 8, 1873; application filed October 17, 1872.

CASE A.

*To all whom it may concern:*

Be it known that I, GEORGE M. HUSTON, of Zanesville, in the county of Muskingum and State of Ohio, have invented certain new and useful Improvements in Egg-Carriers; and I do hereby declare that the following is a full, clear, and exact description thereof, that will enable others skilled in the art to which it appertains to make and use the same, reference being had to the accompanying drawings and to the letters of reference marked thereon, which form a part of this specification.

This invention relates to an improved egg-carrier; and it consists of a receptacle preferably constituted of smaller receptacles or frames—say, three in number—and having strands of broad tape or some other pliable material, and also partitions of canvas or other like substance, substantially as hereinafter more fully set forth.

In the drawing, Figure 1 is a view in cross-section of my egg-carrier, and Fig. 2 is a view in plan of same.

A A refer to the frames constituting the receptacles—say, three in number—disposed one upon the other, and between which frames are interposed the edges of the partitions B B', of canvass or other suitable material, in one or more thicknesses. C C are strands of broad tape, candle or lamp wicking, or other suitable soft material, the whole being so plaited as to leave the spaces D D for the reception of eggs. These strands C are tightly stretched and secured at the ends in any suitable manner. The method shown in the drawing is by having cleats or strips E nailed down upon them; but they may be secured by making the strands continuous, passing through holes in the frame and be corded up like the old method of cording up bedsteads. I do not limit myself to any particular method of fastening the strands C C.

The eggs are placed in the openings or spaces D D, and rest upon the upper sheet of canvas B, which, being elastic, prevents the eggs from any sudden concussions caused by a jar or fall. The strands of fabric C C, passing entirely around each egg, prevent them from striking each other, and yield readily to any pressure that may be brought upon them from jarring, or caused by the difference in size of the eggs. After the eggs are all placed they are covered by another frame or receptacle just like the one shown and described, the lower partition thereof, indicated in the drawing by the letter B', resting upon and firmly securing the eggs below, and this carrier is then filled in like manner as the first one. When a sufficient number are packed the whole tier of receptacles or boxes may be secured in one large box; or battens may be nailed to the sides, a padded cover placed over the top layer, and they may be thus shipped.

Having thus described my invention, what I claim, and desire to secure by Letters Patent, is—

The egg-carrier herein described, composed of frames A, partitions B B', and pliable strands C C, all constructed, arranged, and operating substantially as set forth and shown.

In testimony that I claim the foregoing I have hereunto set my hand this 15th day of October, 1872.

G. M. HUSTON.

Witnesses:
WELLS LEGGETT,
WM. G. HENDERSON.